Oct. 20, 1936.  C. P. WIDDICOMBE  2,058,199
BRAKE BEAM
Filed Oct. 7, 1933
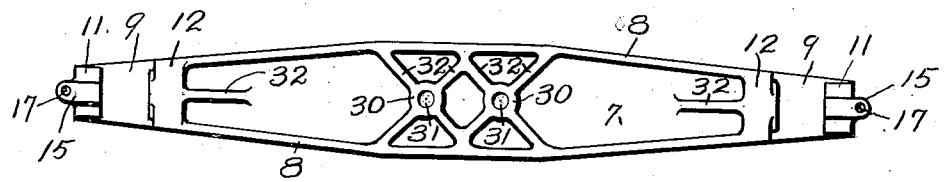
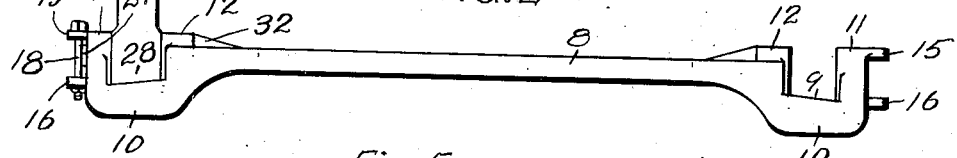
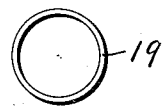
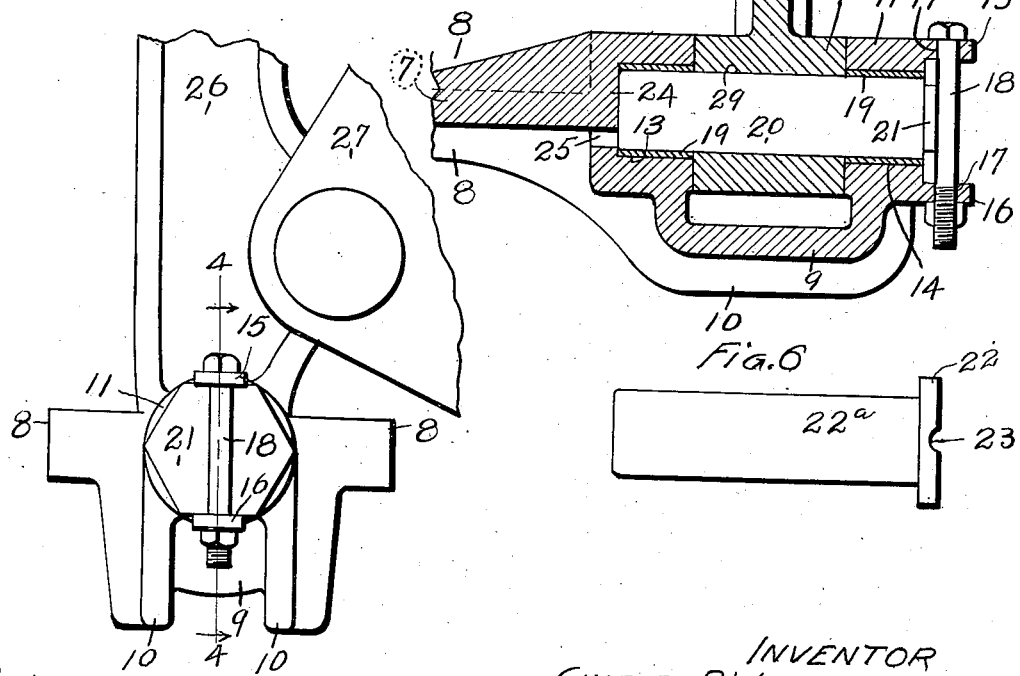
INVENTOR
CHARLES P. WIDDICOMBE
By Walter C. Stein
ATTY.

Patented Oct. 20, 1936

2,058,199

UNITED STATES PATENT OFFICE 2,058,199

BRAKE BEAM

Charles P. Widdicombe, Chicago, Ill., assignor to Sivyer Steel Casting Company, Milwaukee, Wis., a corporation of Wisconsin Application October 7, 1933, Serial No. 692,605

5 Claims. (Cl. 188—219)

My invention relates to brake beams, and more particularly to brake beams used on railway rolling stock, and is particularly designed to permit a rapid servicing of the braking structure with a minimum of shop work.

The brake beams now in general use, especially on locomotives, are forgings with an integral trunnion at each end, by means of which the beam is secured to the hanger levers. When these trunnions become worn it is necessary to remove the brake beam, build up the trunnion by any of the well known shop methods, machine it and then place it in position again, as well as disconnecting and reconnecting the pull rods; but with my beam, the construction of which will be hereafter fully described, it is only necessary to remove a worn stud or pin and replace it with a new one.

Rolling stock equipped with my brake beam can have its brake mechanism serviced without withdrawing it from actual service for any great length of time, and consequently the braking system be kept in a state of high efficiency at all times and at a relatively low cost.

In the drawing:

Fig. 1 is a top plan view of my brake beam;

Fig. 2 is a side view of the same, showing the lower portion of a hanger lever attached thereto;

Fig. 3 is an enlarged end view of the brake beam with portions of the hanger lever and brake head in position;

Fig. 4 is a section taken on the line 4—4 of Fig. 3;

Fig. 5 is an end view of one of the bushings made use of; and

Fig. 6 is a side view of a modified form of stud for securing the hanger lever to the brake beam.

Referring to the drawing in detail, the brake beam consists of a cast metal body having a web 7 which is provided along its sides with flanges or ribs 8 and at each end with a substantially U-shaped yoke 9 which are provided with reinforcing ribs 10.

Each yoke is provided with bosses 11 and 12, which are in axial alinement with each other. The bosses 12 are each provided with a cylindrical recess 13, which is preferably cored, and the bosses 11 with a cylindrical opening 14, also preferably cored, and the recesses 13 and openings 14 are also in axial alinement.

Projecting outwardly from each of the bosses 11 are ears 15 and 16, which are diametrically opposite each other and which are provided with openings 17 for the reception of a locking means 18. This locking means may be a bolt, as shown in the drawing, or it may be a tapered pin, a cotter key or any other locking device.

Located in each recess 13 and opening 14, are bushings 19. These bushings are preferably pressed into position and are adapted to receive a stud or pin 20 which is preferably provided with an angular or polygonal head 21, the two opposite edges of which are adapted to fit snugly between the ears 15 and 16, thus preventing the stud from turning. The modified form of pin 22ª shown in Fig. 6 is provided with a circular head 22 which has a groove 23 extending diametrically across its face, into which a portion of the locking means 18 extends, thereby preventing rotation of the pin.

The wall 24 of each recess 13 is provided with an opening 25 through which a punch may be inserted to drive out the pin 20 when the same has become worn and needs to be replaced.

The hanger lever 26 is of ordinary construction and therefore has not been shown or described in detail. The hanger has the usual brake head 27. The lower end of the hanger lever is provided with a boss 28 which is designed to fit between the bosses 11 and 12 at each end of the brake beam, the boss having a bore 29 therethrough which snugly fits the pin 20.

The web 7 is provided with a plurality of bosses 30 having cored openings 31 therethrough, so that the brake-operating mechanism can be attached thereto. I do not desire to limit myself to the position of the bosses as shown in the drawing, as the position thereof must necessarily be varied to suit different types of braking systems and different locations of the brake beams.

The web 7 is also preferably reinforced by means of ribs 32, suitably placed so as to strengthen the beam at points of greatest strain. The position of these ribs may be varied from that shown, without departing from the spirit of my invention. It will also be observed that the locking member prevents longitudinal movement of the pin or stud 20, thereby preventing wear on the bushings 19.

In placing my beam in position, the hanger levers are first pivoted to the locomotive or car frame in the usual manner, and the beam is then raised up so that the boss 29 on the hanger lever passes between the bosses 11 and 12 of the yoke 9. The bore 29 is brought into alinement with the bores of the bushings 19 and then the pin 20 is inserted with the head 21 between the ears 15 and 16, as shown in Fig. 3, after which the locking means 18 is placed in position as shown in the drawing, and lastly, the brake-operating mechanism is connected to the beam by means of pins or bolts passing through the openings 31 in the body portion, which have been cored therein in the proper locations. When a pin has become worn and is to be replaced, all that is necessary is to remove the locking means, insert a punch or drift pin through the opening 25 and drive the pin 20 out, after which a new pin can be readily inserted.

From the foregoing it will be seen that rolling stock equipped with my brake beam can have the braking system serviced quickly and more economically than is possible with the forged brake beams now ordinarily used, as such brake beams have trunnions forged on the ends which must be machined, in the first place, and when worn these trunnions must be up-set or built up to increase their diameter, after which the trunnions must be again machined. This is not only a lengthy and expensive operation, as the brake beams must be completely removed for these operations, but also necessitates the withdrawal of the rolling stock for a considerable length of time, which is another added cost; and in addition, expensive machinery is needed to perform the above operations, all of which is eliminated by the use of my brake beam. In fact, practically all of the tools needed to service my brake beam are a hammer and punch and possibly a wrench, as there is no disconnection of the brake-operating mechanism or removal of the brake beam necessary.

It is to be understood that all of the openings in the beam are cored smooth, so that no machining is needed. The bushings 19 are pressed into position, and since the pin 20 is held against rotation in these bushings, they will last indefinitely. The bore 29 of the hanger lever 26 may also be bushed if found desirable.

Having fully described my invention, what I claim is:

1. A brake beam comprising a cast body portion, an integral yoke carried by each end of said body portion, cored bosses located on and above said yoke in axial alinement with each other, axially alined bushings located in said bosses, a pin removably carried by said bushings, locking means carried by said yoke for preventing longitudinal movement of said pin, and means for preventing rotation of said pin.

2. A brake beam comprising a cast body portion having a yoke integral with each end, bosses having cored openings in axial alinement carried by the upper portion of each of said yokes, bushings located in said openings, a pin having a polygonal head carried by the bushings of each yoke and means carried by one boss of each yoke for engagement with said head, whereby said pin is prevented from rotating.

3. A brake beam comprising a cast body portion provided with reinforcing ribs, an integral yoke at each end of said body portion, a pair of bosses integral with and above said yoke and having axially alined cored openings therein, bushings located in said openings, a pin having a head carried by the bushings of each yoke, and means carried by each yoke and engaging with said head whereby rotation of said pin is prevented.

4. A brake beam comprising a cast body portion provided with reinforcing ribs, a yoke integral with said body portion, a boss integral with and extending above each end of each yoke and having axially alined cored openings therein, bushings located in each of said openings, a pin having a polygonal head carried by the bushings of each yoke, ears diametrically opposite each other projecting outwardly from the outer boss of each yoke and contacting the edge of the polygonal head, thereby preventing the pin from turning, and a pin carried by said ears and extending across the face of said polygonal head whereby longitudinal movement of said pin in said bushings is prevented.

5. A brake beam comprising a body portion having reinforcing ribs along its longitudinal edges, a U-shaped yoke at each end of said body portion, bosses in axial alinement with each other carried by said yoke, said yoke having a cored cylindrical opening formed in the outermost boss and a cored cylindrical recess formed in the innermost boss, said cored opening and recess being in axial alinement, bosses formed on the upper face of said body portion, said bosses being provided with cored openings extending axially therethrough and through said body portion, and reinforcing ribs extending radially from said bosses to said first mentioned reinforcing ribs, the entire brake beam being a unitary casting.

CHARLES P. WIDDICOMBE.